(12) United States Patent
Fujitsuka et al.

(10) Patent No.: US 10,480,838 B2
(45) Date of Patent: Nov. 19, 2019

(54) CONTROL DEVICE FOR REFRIGERATION CYCLE APPARATUS, AND CONTROL METHOD FOR REFRIGERATION CYCLE APPARATUS, AND REFRIGERATION CYCLE APPARATUS

(71) Applicant: Mitsubishi Electric Corporation, Chiyoda-ku (JP)

(72) Inventors: Masashi Fujitsuka, Chiyoda-ku (JP); Masaya Kimura, Chiyoda-ku (JP); Kazunori Tsuchino, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 133 days.

(21) Appl. No.: 15/545,484

(22) PCT Filed: Mar. 2, 2015

(86) PCT No.: PCT/JP2015/056122
§ 371 (c)(1),
(2) Date: Jul. 21, 2017

(87) PCT Pub. No.: WO2016/139736
PCT Pub. Date: Sep. 9, 2016

(65) Prior Publication Data
US 2018/0010834 A1    Jan. 11, 2018

(51) Int. Cl.
*F25B 49/02* (2006.01)
*F25B 13/00* (2006.01)

(52) U.S. Cl.
CPC .......... *F25B 49/02* (2013.01); *F25B 2500/19* (2013.01); *F25B 2600/0253* (2013.01);
(Continued)

(58) Field of Classification Search
CPC .............. F25B 13/00; F25B 2313/0314; F25B 2313/0315; F25B 2341/0653;
(Continued)

(56) References Cited

U.S. PATENT DOCUMENTS 4,745,767 A * 5/1988 Ohya .................... F25B 41/062
62/211
2012/0260678 A1* 10/2012 Yoshida ................ F25B 41/062
62/56

FOREIGN PATENT DOCUMENTS

| JP | 6-201198 | 7/1994 |
|----|----------|--------|
| JP | 11-159835 | 6/1999 |
| JP | 11-218349 | 8/1999 |

OTHER PUBLICATIONS

International Search Report dated May 26, 2015 in PCT/JP2015/056122 filed Mar. 2, 2015.

* cited by examiner

*Primary Examiner* — Edward F Landrum
*Assistant Examiner* — Chang H. Park
(74) *Attorney, Agent, or Firm* — Oblon, McClelland, Maier & Neustadt, L.L.P.

(57) ABSTRACT

A refrigeration cycle apparatus controller includes an expansion-valve controller configured to output an opening-degree command for an expansion valve based on a deviation between a discharge temperature of refrigerant discharged from a compressor and a set discharge temperature, and at least two control parameters including a proportionality coefficient and an integral coefficient, a flow-rate-correction-coefficient calculator configured to calculate a flow-rate correction coefficient from a refrigerant flow rate of refrigerant circulating through a refrigerant circuit and a preset flow-rate reference value, and a coefficient corrector configured to calculate the proportionality coefficient by cor- (Continued)

recting a preset proportionality-coefficient reference value based on the flow-rate correction coefficient, and calculate the integral coefficient by correcting a preset integral-coefficient reference value based on the flow-rate correction coefficient. The proportionality coefficient and the integral coefficient are calculated such that a variation range of the integral coefficient rate is larger than a variation range of the proportionality coefficient.

12 Claims, 4 Drawing Sheets

(52) U.S. Cl.
CPC .................. *F25B 2600/2513* (2013.01); *F25B 2700/1931* (2013.01); *F25B 2700/1933* (2013.01); *F25B 2700/21152* (2013.01)

(58) Field of Classification Search
CPC .......... F25B 2500/19; F25B 2600/0253; F25B 2600/2513; F25B 2700/1931; F25B 2700/1933; F25B 2700/2104; F25B 2700/21152; F25B 49/02; Y02B 30/72; Y02B 30/741
See application file for complete search history.

CONTROL DEVICE FOR REFRIGERATION CYCLE APPARATUS, AND CONTROL METHOD FOR REFRIGERATION CYCLE APPARATUS, AND REFRIGERATION CYCLE APPARATUS

TECHNICAL FIELD

The present invention relates to control devices and control methods for controlling the opening degrees of expansion valves in refrigeration cycle apparatuses.

BACKGROUND ART

In the related art, various methods for controlling the opening degrees of expansion valves in refrigeration cycle apparatuses have been proposed (e.g., see Patent Literature 1). Patent Literature 1 discloses determining a corrected deviation by multiplying a deviation between a discharge temperature and a set discharge temperature and a deviation between a refrigerant temperature and a target refrigerant temperature by a correction coefficient corresponding to a current value of the operating frequency of a compressor (i.e., the magnitude of a load), and then determining the capacity of the compressor and the opening degree of an electrically-driven expansion valve on the basis of the determined corrected deviation.

CITATION LIST

Patent Literature

Patent Literature 1: Japanese Unexamined Patent Application Publication No. 11-218349

SUMMARY OF INVENTION

Technical Problem

In the control performed in Patent Literature 1 in which the opening degree of the expansion valve is determined on the basis of the discharge temperature, corrections in a proportional action and an integral action are performed at the same ratio, when the deviation of the subject being controlled, such as the opening degree of the expansion valve, and the proportional action and the integral action performed at predetermined control cycles for calculating this deviation are considered separately from each other. However, with regard to the relationship between the discharge temperature and the opening degree of the expansion valve, a variation range in which the proportional action changes and a variation range in which the integral action changes in the entire load range from the minimum load to the maximum load are not always identical to each other. In the case where the corrections in the proportional action and the integral action are performed at the same ratio, as in Patent Literature 1, for example, an increase in the correction amount from a steady state serving as a reference may result in reduced responsiveness of the discharge temperature of the compressor relative to the opening degree of the expansion valve. Thus, the operating frequency of the compressor and the opening degree of the expansion valve do not match, thus resulting in a longer time in which a proper discharge temperature cannot be obtained and reduced responsiveness particularly in a transient state. Consequently, energy required for conveying heat is wasted, thus leading to deterioration in energy saving properties.

The present invention has been made to solve the problems mentioned above, and an object of the present invention is to provide a control device and a control method for a refrigeration cycle apparatus that can suppress deterioration in energy saving properties by improving the responsiveness of a discharge temperature of a compressor over a wide load range.

Solution to Problem

One embodiment of the present invention provides a control device of a refrigeration cycle apparatus including a refrigerant circuit in which a compressor, a condenser, an expansion valve, and an evaporator are connected by a refrigerant pipe. The control device includes an expansion-valve control unit configured to output an opening-degree command for the expansion valve on the basis of a discharge-temperature deviation between a discharge temperature of refrigerant discharged from the compressor and a set discharge temperature, and at least two types of control parameters including a proportionality coefficient and an integral coefficient, a flow-rate-correction-coefficient calculating unit configured to calculate a flow-rate correction coefficient from a refrigerant flow rate of refrigerant circulating through the refrigerant circuit and a preset flow-rate reference value, and a coefficient correcting unit configured to calculate the proportionality coefficient by correcting a preset proportionality-coefficient reference value on the basis of the flow-rate correction coefficient, and calculate the integral coefficient by correcting a preset integral-coefficient reference value on the basis of the flow-rate correction coefficient. The coefficient correcting unit is configured to calculate the proportionality coefficient and the integral coefficient such that a variation range of the integral coefficient within a variation range of the refrigerant flow rate is larger than a variation range of the proportionality coefficient within the variation range of the refrigerant flow rate.

Advantageous Effects of Invention

In the control device and the control method for the refrigeration cycle apparatus according to embodiments of the present invention, the proportionality coefficient and the integral coefficient are calculated such that a ratio between a maximum value and a minimum value of the variation range of the integral coefficient is larger than a ratio between a maximum value and a minimum value of the variation range of the proportionality coefficient in the variation range of the refrigerant flow rate, so that the variation response of the discharge temperature corresponding to the opening degree of the expansion valve that varies depending on the refrigerant flow rate can be improved over a wide load range. Moreover, it is possible to suppress deterioration in energy saving properties caused by a mismatch between the rotation frequency of the compressor and the opening degree of the expansion valve due to a slow variation response of the expansion discharge temperature.

DESCRIPTION OF EMBODIMENT

Figure 1:
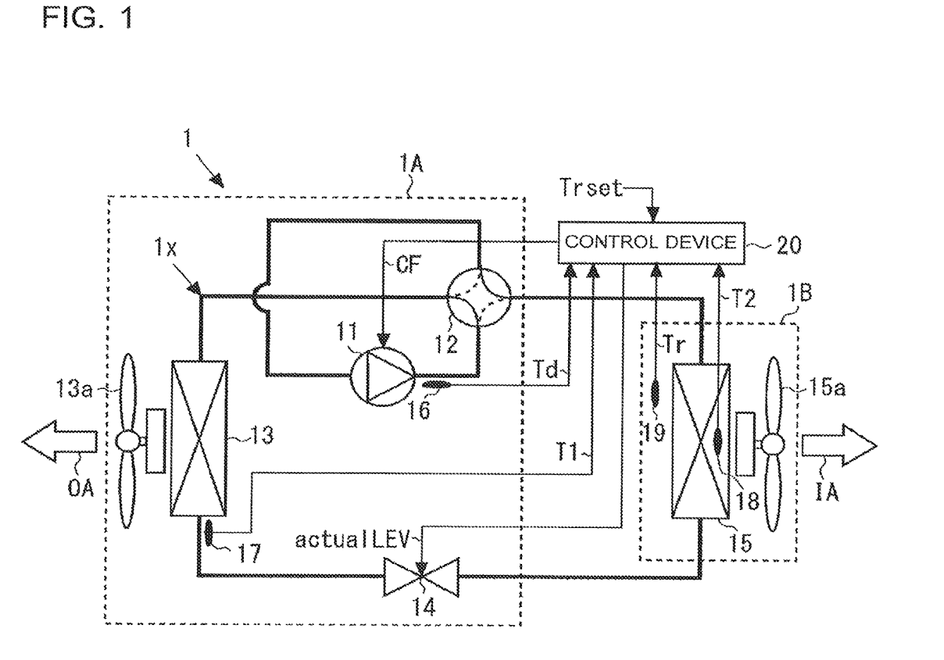
FIG. 1 is a refrigerant circuit diagram illustrating a control device of a refrigeration cycle apparatus according to Embodiment of the present invention.

A control device of a refrigeration cycle apparatus according to preferred Embodiment of the present invention will be described below with reference to the drawings. FIG. 1 is a refrigerant circuit diagram illustrating a control device of a refrigeration cycle apparatus according to Embodiment of the present invention. A control device 20 of a refrigeration cycle apparatus in FIG. 1 controls the operation of a refrigeration cycle apparatus 1. The refrigeration cycle apparatus 1 includes a refrigerant circuit 1x in which an outdoor unit 1A and an indoor unit 1B are connected to each other by refrigerant pipes 2. As refrigerant flowing through the refrigerant circuit 1x, for example, refrigerant that can be turned into a two-phase gas-liquid state within an operating temperature and pressure range, such as fluorocarbon, hydrocarbon, and carbon dioxide, is used. Other examples of refrigerant that may be used include HFC refrigerant, such as R410A, R407C, and R404A, HCFC refrigerant, such as R22 and R134a, and natural refrigerant, such as helium.

The outdoor unit 1A has a compressor 11, a flow switching device 12 connected to the discharge side of the compressor 11, an outdoor-side heat exchanger 13 connected to the flow switching device 12, and an expansion valve 14 connected to the outdoor-side heat exchanger 13. The indoor unit 1B has an indoor-side heat exchanger 15 connected to the flow switching device 12 and the expansion valve 14. The compressor 11 pressure-feeds the refrigerant in a compressed-gas-phase state and turns it into a high-temperature high-pressure state and is, for example, an inverter compressor capable of controlling the capacity by adjusting the rotation frequency or the operating frequency. The operation of the compressor 11 is controlled by the control device 20. The compressor 11 and the flow switching device 12 may be installed at the indoor unit 1B side instead of the outdoor unit 1A side. Furthermore, the expansion valve 14 may be installed at the indoor unit 1B side instead of the outdoor unit 1A side. Moreover, the outdoor unit 1A and the indoor unit 1B may be integrated with each other instead of being separated from each other.

The flow switching device 12 is formed of, for example, a four-way valve and switches the refrigerant flow path corresponding to the operation mode. When heating operation is performed, the flow switching device 12 connects the discharge side of the compressor 11 and the indoor unit 1B, and also connects the outdoor-side heat exchanger 13 and the suction side of the compressor 11. When cooling operation is performed, the flow switching device 12 connects the discharge side of the compressor 11 and the outdoor-side heat exchanger 13, and also connects the indoor unit 1B and the suction side of the compressor 11.

The outdoor-side heat exchanger 13 is, for example, a fin-and-tube-type heat exchanger that exchanges heat between refrigerant flowing through a refrigerant pipe and outdoor air OA passing through gaps between fins. The outdoor-side heat exchanger 13 has one side connected to the flow switching device 12 and the other side connected to the expansion valve 14. The outdoor-side heat exchanger 13 acts as a heat absorber (evaporator) during heating operation and acts as a radiator (condenser) during cooling operation. The outdoor air OA supplied from an outdoor fan 13a is blown to the outdoor-side heat exchanger 13.

The expansion valve 14 is formed of, for example, an electronic expansion valve whose opening degree is variable, and expands high-pressure liquid-phase refrigerant into a gas-liquid mixture state to turn it into a low-temperature low-pressure state. The opening degree of the expansion valve 14 is controlled by the control device 20.

The indoor-side heat exchanger 15 is formed of, for example, a fin-and-tube-type heat exchanger that exchanges heat between refrigerant flowing through a refrigerant pipe and indoor air IA passing through gaps between fins. The indoor-side heat exchanger 15 acts as a radiator (condenser) during heating operation and acts as a heat absorber (evaporator) during cooling operation. The indoor air IA supplied from an indoor fan 15a is blown to the indoor-side heat exchanger 15.

Next, an operational example of the refrigeration cycle apparatus 1 in a heating operation mode and a cooling operation mode will be described with reference to FIG. 1. First, during cooling operation, high-temperature high-pressure refrigerant discharged from the compressor 11 flows into the outdoor-side heat exchanger 13 acting as a condenser where the refrigerant rejects heat and condenses by exchanging heat with the outdoor air OA, thus becoming high-pressure liquid refrigerant. Then, the refrigerant that has become high-pressure liquid refrigerant is reduced in pressure at the expansion valve 14 to become low-temperature low-pressure two-phase gas-liquid refrigerant, and the refrigerant then flows into the indoor-side heat exchanger 15 acting as an evaporator. The refrigerant flowing into the indoor-side heat exchanger 15 receives heat and evaporates by exchanging heat with the indoor air IA, so that the indoor air IA is cooled. Subsequently, the refrigerant flowing out from the indoor-side heat exchanger 15 passes through the flow switching device 12 and flows into the suction side of the compressor 11.

Next, during heating operation, high-temperature high-pressure refrigerant discharged from the compressor 11 flows into the indoor-side heat exchanger 15 acting as a condenser where the refrigerant rejects heat and condenses by exchanging heat with the indoor air IA, thus becoming high-pressure liquid refrigerant. In this case, the indoor air IA is heated by the heat rejected from the refrigerant. Then, the liquid refrigerant is reduced in pressure by passing through the expansion valve 14 to become low-temperature low-pressure two-phase gas-liquid refrigerant, and the refrigerant then flows into the outdoor-side heat exchanger 13 acting as a condenser. The refrigerant flowing into the outdoor-side heat exchanger 13 receives heat and evaporates by exchanging heat with the outdoor air OA to become low-temperature low-pressure gas refrigerant. The refrigerant flowing out from the indoor-side heat exchanger 15 passes through the flow switching device 12 and flows into the suction side of the compressor 11.

As described, the refrigeration cycle apparatus 1 performs cooling or heating by utilizing condensation and evaporation of the refrigerant in the refrigerant circuit 1x and transferring the heat received from one of the outdoor air OA and the indoor air IA to the other. In this case, the heat can be transferred efficiently between the outdoor air OA and the indoor air IA via the refrigerant with the power required for compression in the compressor 11.

The operation of the refrigeration cycle apparatus 1 is controlled by the control device 20. The control device 20 may be provided at the outdoor unit 1A side, may be provided at the indoor unit 1B side, may be provided separately from the outdoor unit 1A and the indoor unit 1B, or may be provided such that corresponding functions are divided to be provided to the outdoor unit 1A and the indoor unit 1B. Various types of sensors are installed in the refrigeration cycle apparatus 1, and the control device 20 controls the operation of the refrigeration cycle apparatus 1 on the basis of information obtained by each type of sensors.

In detail, the refrigeration cycle apparatus 1 has a discharge sensor 16 provided at the discharge side of the compressor 11 and measuring a discharge temperature Td of refrigerant discharged from the compressor 11, a first refrigerant temperature sensor 17 measuring a temperature T1 of refrigerant flowing between the outdoor-side heat exchanger 13 and the expansion valve 14, a second refrigerant temperature sensor 18 measuring a temperature T2 of refrigerant at a position where the refrigerant is in a two-phase gas-liquid state or in a liquid phase in the indoor-side heat exchanger 15, and an air temperature sensor 19 measuring a room temperature Tr of indoor air.

The temperature T1 of refrigerant measured by the first refrigerant temperature sensor 17 is substantially similar to a condensing temperature Tc when the outdoor-side heat exchanger 13 acts as a condenser, and is substantially similar to an evaporating temperature Te when the outdoor-side heat exchanger 13 acts as an evaporator. The temperature T2 of refrigerant measured by the second refrigerant temperature sensor 18 is substantially similar to the condensing temperature Tc when the indoor-side heat exchanger 15 acts as a condenser, and is substantially similar to the evaporating temperature Te when the indoor-side heat exchanger 15 acts as an evaporator.

On the basis of a set room temperature Trset input and commanded from, for example, a remote controller, which is not shown, the room temperature Tr, the discharge temperature Td, and the temperatures T1 and T2, the control device 20 calculates a rotation-frequency command CF for the compressor 11 and an opening-degree command actualLEV for the expansion valve 14 and outputs the two commands to the compressor 11 and the expansion valve 14, respectively. Furthermore, the control device 20 has a function for controlling the flow switching device 12 for changing the rotation frequency of the outdoor fan 13a, the rotation frequency of the indoor fan 15a, or the refrigerant circulating direction corresponding to the operating conditions of the refrigeration cycle apparatus 1.

Figure 2:
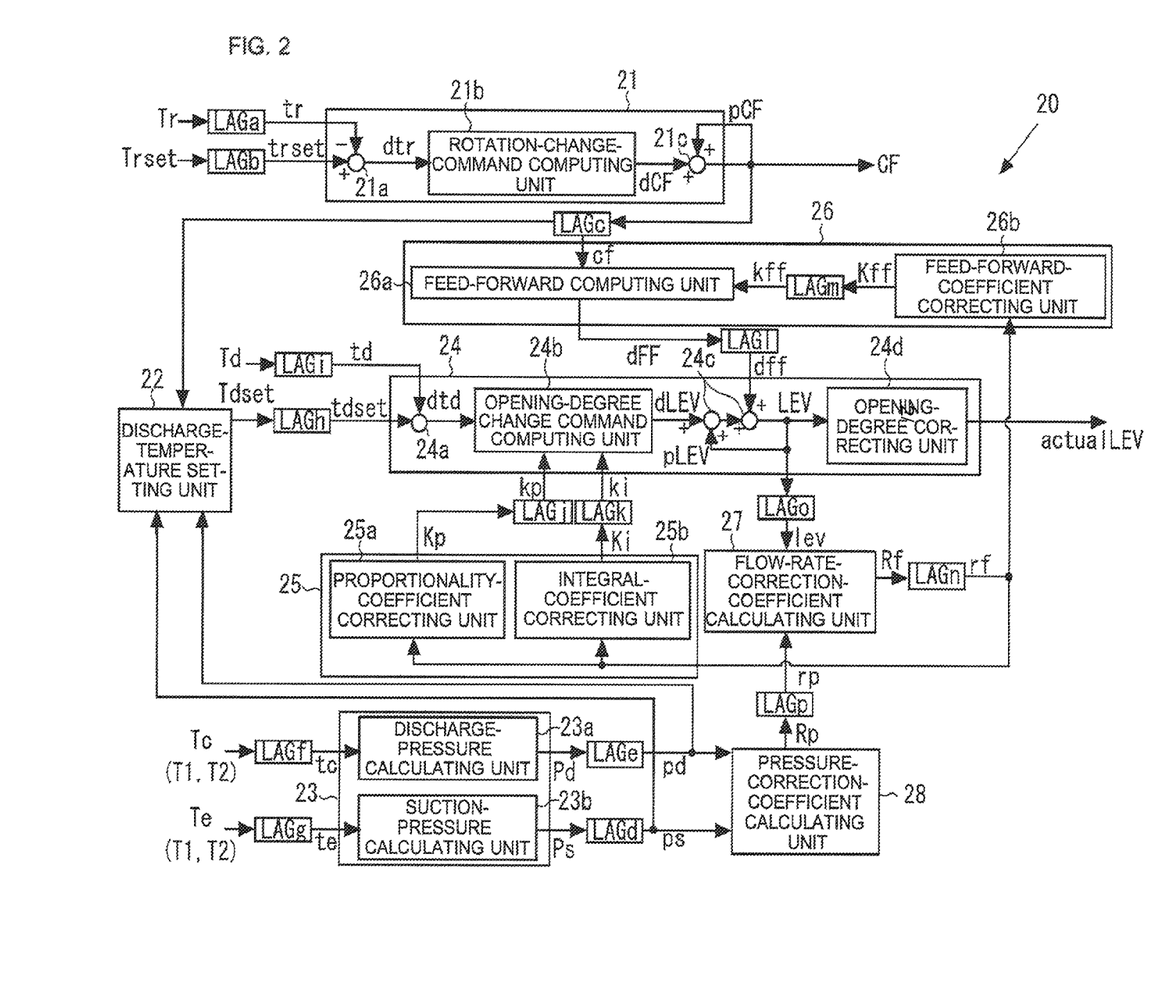
FIG. 2 is a functional block diagram illustrating an example of the control device of the refrigeration cycle apparatus in FIG. 1.

FIG. 2 is a functional block diagram illustrating an example of the control device of the refrigeration cycle apparatus in FIG. 1. The control device 20 will be described with reference to FIG. 2. The configuration of the control device 20 illustrated in FIG. 2 is established by executing a program in hardware, such as a microcomputer.

Figure 3:
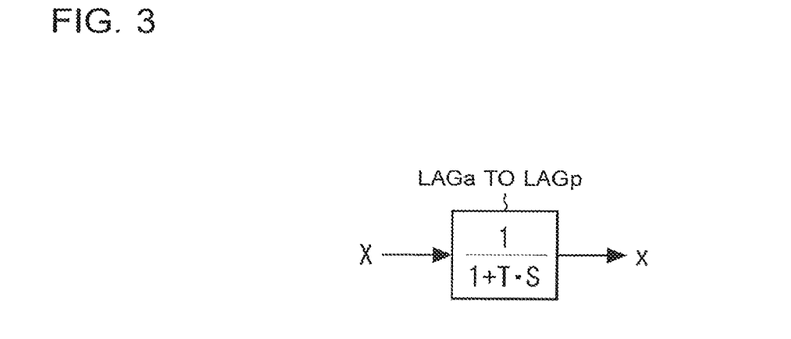
FIG. 3 is a block diagram illustrating an example of each limiting controller in the control device in FIG. 2.

A plurality of rate-of-change limiters LAGa to LAGp illustrated in FIG. 2 are each provided for suppressing control hunting and are formed of, for example, first-order lag computing units. FIG. 3 is a block diagram illustrating an example of each limiting controller in the control device in FIG. 2. Each of the rate-of-change limiters LAGa to LAGp in FIG. 3 calculates an output x on the basis of Expression (1) and Expression (2) below when an input is defined as X.

[Expression 1]

$$dx = \frac{X - px}{T} dt \quad (1)$$

[Expression 2]

$$x = px + |dx| \text{ at } X - px \geq |dx| \quad (2)$$
$$X \text{ at } |X - px| < |dx|$$
$$px - |dx| \text{ at } X - px \leq -|dx|$$

In Expression (1), dt denotes a control cycle and T denotes a lag time constant. In Expression (1) and Expression (2), dx denotes a change in output between control cycles dt, and px denotes an output in the preceding control cycle (the term "preceding control cycle" is used to denote "the time point in one previous control cycle" relative to the current time point, and the same applies to similar expressions hereinafter). In FIG. 3, S denotes a Laplace operator (=d/dt, d being a differential). Furthermore, Expression (2) is an example of a difference expansion expression of each of the rate-of-change limiters LAGa to LAGp as first-order lag computing units. The lag time constant T may be varied among the rate-of-change limiters LAGa to LAGp.

The control device 20 in FIG. 2 includes a compressor control unit 21, a discharge-temperature setting unit 22, a temperature-pressure converting unit 23, an expansion-valve control unit 24, a coefficient correcting unit 25, a feed forward unit 26, and a flow-rate-correction-coefficient calculating unit 27. The compressor control unit 21 outputs the rotation-frequency command CF for controlling the rotation frequency of the compressor 11. In detail, the compressor control unit 21 has a difference calculating unit 21a that calculates a difference between a set room temperature trset and a room temperature tr, a rotation-change-command computing unit 21b that computes a rotation-frequency change command dCF on the basis of the difference calculated by the difference calculating unit 21a, and a rotation-frequency-command calculating unit 21c that calculates the rotation-frequency command CF from the rotation-frequency change command dCF computed by the rotation-change-command computing unit 21b. The compressor control unit 21 performs the following various types of computing for each control cycle dt.

The difference calculating unit 21a receives the set room temperature trset obtained after the set room temperature Trset goes through the rate-of-change limiter LAGa and a room temperature tr obtained after the room temperature Tr goes through the rate-of-change limiter LAGb. The set room temperature Trset is input to the control device 20 from, for example, a remote controller. The difference calculating unit 21a calculates a room-temperature deviation dtr on the basis of the set room temperature trset, the room temperature tr, and Expression (3) below.

[Expression 3]

$$dtr = trset - tr \quad (3)$$

The rotation-change-command computing unit 21b computes the rotation-frequency change command dCF, indicating an amount of change in the rotation frequency of the compressor 11, by using the room-temperature deviation dtr calculated by the difference calculating unit 21a. For example, the compressor control unit 21 is constituted of a PI controller (P denoting proportional and I denoting integral) having a proportionality coefficient Kpcf and an integral coefficient Kicf, serving as two types of control parameters, of the compressor control unit 21. The rotation-change-command computing unit 21b computes the rotation-frequency change command dCF on the basis of Expression (4) below.

[Expression 4]

$$dCF = Kpcf \cdot (dtr - pdtr) + Kicf \cdot dtr \cdot dt \qquad (4)$$

Expression (4) is an expansion expression of a speed-type PI controller, in which pdtr denotes a room-temperature deviation calculated in the preceding control cycle. In Expression (4), the first term on the right side corresponds to a proportional action, and the second term on the right side corresponds to an integral action. Specifically, the rotation-change-command computing unit 21b calculates the rotation-frequency change command dCF for each control cycle dt by using a room-temperature deviation pdtr calculated in the preceding control cycle in addition to the room-temperature deviation dtr in the proportional action and by using the room-temperature deviation dtr in the integral action.

The rotation-frequency-command calculating unit 21c calculates the rotation-frequency command CF for the compressor 11 in the current control cycle by adding a rotation-frequency command pCF for the compressor 11 in the preceding control cycle to the rotation-frequency change command dCF in the current control cycle calculated by the rotation-change-command computing unit 21b (the term "current control cycle" is used to denote the "current time point", and the same applies to similar expressions hereinafter). Specifically, the rotation-frequency-command calculating unit 21c calculates and outputs the rotation-frequency command CF, as indicated in Expression (5) below.

[Expression 5]

$$CF = pCF + dCF \qquad (5)$$

The discharge-temperature setting unit 22 computes a set discharge temperature tdset of refrigerant discharged from the compressor 11 by using a rotation-frequency command cf calculated by the compressor control unit 21 and a discharge pressure Pd and a suction pressure Ps of the compressor 11, and sets the computation result as a set value of the expansion-valve control unit 24. The discharge-temperature setting unit 22 computes a set discharge temperature Tdset by using Expression (6) below. The discharge-temperature setting unit 22 receives a rotation-frequency command cf, a discharge pressure pd, and a suction pressure ps obtained after the rotation-frequency command CF, the discharge pressure Pd, and the suction pressure Ps go through the rate-of-change limiters LAGc, LAGd, and LAGe, respectively.

[Expression 6]

$$Tdset = \{te + f2(cf)\}\left\{a\left(\frac{pd}{ps}\right)^3 + b\left(\frac{pd}{ps}\right)^2 + c\frac{pd}{ps} + d\right\} + e \qquad (6)$$

Although Expression (6) is exemplified as a third-order expression of an expansion ratio (pd/ps), Expression 6 may be a higher-order expression, a lower-order expression, or another function using, for example, an expansion ratio. Furthermore, the function f2 in Expression (6) is a function in which the effect of the configuration of the refrigerant circuit 1x is incorporated and indicating the relationship between the rotation-frequency command cf and a superheat temperature, and can be expressed as, for example, f2(cf)=a2·cf+b2. Although the function f2 is exemplified as a first-order expression of the rotation-frequency command cf with a2 and b2 serving as coefficients, the function f2 may be a higher-order expression, a lower-order expression, or another function using, for example, the rotation-frequency command cf.

Although the discharge pressure Pd and the suction pressure Ps may be measured directly by using pressure sensors, the control device 20 has the temperature-pressure converting unit 23 that calculates the discharge pressure Pd and the suction pressure Ps of the refrigerant in the compressor 11 from the condensing temperature Tc and the evaporating temperature Te. The temperature-pressure converting unit 23 includes a discharge-pressure calculating unit 23a that calculates the discharge pressure Pd from a condensing temperature tc and a suction-pressure calculating unit 23b that calculates the discharge pressure Pd from the condensing temperature tc.

On the basis of Expression (7) below, the discharge-pressure calculating unit 23a calculates the discharge pressure Pd of the compressor 11 from the condensing temperature tc obtained after the condensing temperature Tc goes through the rate-of-change limiter LAGf.

[Expression 7]

$$Pd = f1(tc) = a1 \cdot tc^3 + b1 \cdot tc^2 + c1 \cdot tc + d1 \qquad (7)$$

On the basis of Expression (8) below, the suction-pressure calculating unit 23b calculates the suction pressure Ps of the compressor 11 from the evaporating temperature te obtained after the evaporating temperature Te goes through the rate-of-change limiter LAGg.

[Expression 8]

$$Ps = f1(te) = a1 \cdot te^3 + b1 \cdot te^2 + c1 \cdot te + d1 \qquad (8)$$

In Expression (7) and Expression (8), f1 denotes a temperature-pressure characteristic function of the refrigerant and is used for calculating a saturation pressure at the temperature of the refrigerant. Furthermore, a1, b1, c1, and d1 denote coefficients of the temperature-pressure characteristic function f1. Although Expression (7) and Expression (8) are exemplified as third-order expressions of the temperature-pressure characteristic function f1, these expressions may be higher-order expressions, lower-order expressions, or known techniques, such as other functions, so long as they can be used for calculating the discharge pressure Pd and the suction pressure Ps from the condensing temperature tc and the evaporating temperature te.

The condensing temperature Tc and the evaporating temperature Te mentioned above are measured at different positions between the cooling operation mode and the heating operation mode, and are determined by the temperature-pressure converting unit 23 using, for example, Expression (9) on the basis of the temperatures T1 and T2 of the refrigerant measured by the first refrigerant temperature sensor 17 and the second refrigerant temperature sensor 18.

[Expression 9]

$$Tc = \begin{cases} T1 & \text{Heating Operation Mode} \\ T2 + f3 & \text{Cooling Operation Mode} \end{cases} \quad (9)$$

where $f3(cf) = a3 \cdot cf + b3$ $$Te = \begin{cases} T2 & \text{Heating Operation Mode} \\ T1 & \text{Cooling Operation Mode} \end{cases}$$

The condensing temperature Tc and the evaporating temperature Te may be determined by an expression other than Expression (9). Furthermore, a function f3 in Expression (9) is a function in which the effect of the configuration of the refrigerant circuit 1x is incorporated and indicating the relationship between the rotation-frequency command cf and a subcooling temperature. Although the function f3 is a first-order expression of the rotation-frequency command cf with a3 and b3 serving as coefficients, the function f3 may be a higher-order expression, a lower-order expression, or another function.

The expansion-valve control unit 24 includes a discharge-deviation calculating unit 24a, an opening-degree change command computing unit 24b, and an opening-degree command computing unit 24c. The discharge-deviation calculating unit 24a calculates a discharge-temperature deviation dtd between a set discharge temperature tdset obtained after the set discharge temperature Tdset goes through the rate-of-change limiter LAGh and a discharge temperature td obtained after the discharge temperature Td measured by the discharge sensor 16 goes through the rate-of-change limiter LAGi, as in Expression (10) below. The lag time constant T of the rate-of-change limiter LAGh is often in units of minutes (about 2 minutes) and is desirably larger than other first-order lag time constants (about 10 seconds).

[Expression 10]

$$dtd = tdset - td \quad (10)$$

The opening-degree change command computing unit 24b computes an opening-degree change command dLEV by using the discharge-temperature deviation dtd calculated by the discharge-deviation calculating unit 24a and is formed of, for example, a PI controller having a proportionality coefficient kp and an integral coefficient ki serving as two types of control parameters. The opening-degree change command computing unit 24b computes the opening-degree change command dLEV by using Expression (11) below.

[Expression 11]

$$dLEV = kp(dtd - pdtd) + ki \cdot dtd \cdot dt \quad (11)$$

Expression (11) is an expansion expression of a speed-type PI controller, in which the first term on the right side corresponds to a proportional action, and the second term on the right side corresponds to an integral action. The opening-degree change command dLEV is computed by using a discharge-temperature deviation pdtd in the preceding control cycle in addition to the discharge-temperature deviation dtd in the proportional action and by using the discharge-temperature deviation dtd in the integral action. The proportionality coefficient kp and the integral coefficient ki in Expression (11) are calculated by the coefficient correcting unit 25. The coefficient correcting unit 25 calculates a proportionality coefficient Kp and an integral coefficient Ki by correcting a proportionality-coefficient reference value Kpbase and an integral-coefficient reference value Kibase on the basis of a flow-rate correction coefficient rf calculated by the flow-rate-correction-coefficient calculating unit 27, which will be described later, and has a proportionality-coefficient correcting unit 25a and an integral-coefficient correcting unit 25b. The proportionality-coefficient correcting unit 25a calculates a proportionality correction coefficient RKp ($=rf^{NKp}$) from a proportionality correction exponential factor NKp and the flow-rate correction coefficient rf obtained after the flow-rate correction coefficient Rf, to be described later, goes through the rate-of-change limiter LAGn, and also calculates the proportionality coefficient Kp from the proportionality correction coefficient RKp and a preset proportionality-coefficient reference value Kpbase, as in Expression (12) below.

[Expression 12]

$$Kp = RKp \cdot Kpbase = rf^{NKp} \cdot Kpbase \quad (12)$$

Although the proportionality correction coefficient RKp is exemplified as a function having only one term of the flow-rate correction coefficient rf to the power of the proportionality correction exponential factor NKp in Expression (12), for example, the proportionality correction coefficient RKp may alternatively be a multi-term expression or another function using coefficients a4, b4, and c4, or a function using a fixed exponential value in place of the proportionality correction exponential factor NKp, as in Expression (12a) below.

[Expression 12a]

$$RKp = a4 \cdot rf^{NKp} + b4 \cdot rf^{(NKp-1)} + c4 \quad (12a)$$

The integral-coefficient correcting unit 25b calculates an integral correction coefficient RKi ($=rf^{NKi}$) from the flow-rate correction coefficient rf and an integral correction exponential factor NKi and also calculates the integral coefficient Ki from the integral correction coefficient RKi and a preset integral-coefficient reference value Kibase, as in Expression (13) below.

[Expression 13]

$$Ki = RKi \cdot Kibase = rf^{NKi} \cdot Kibase \quad (13)$$

Although the integral correction coefficient RKi is exemplified as a function having only one term of the flow-rate correction coefficient rf to the power of NKi in Expression (13), for example, the integral correction coefficient RKi may alternatively be a multi-term expression or another function using coefficients a5, b5, c5, and d5, or a function using a fixed exponential value in place of the integral correction exponential factor NKi, as in Expression (13a) below.

[Expression 13a]

$$RKi = a5 \cdot rf^{NKi} + b5 \cdot rf^{NKi-1} + c5 \cdot rf^{NKi-2} + d5 \quad (13a)$$

Furthermore, when a variation range of the integral correction coefficient RKi is larger than a variation range of the proportionality correction coefficient RKp relative to a variation change of the flow-rate correction coefficient rf, the proportionality correction coefficient RKp and the integral correction coefficient RKi may be functions other than those exemplified in Expression (12), Expression (12a), Expression (13), and Expression (13a) above.

The proportionality coefficient Kp calculated by the proportionality-coefficient correcting unit 25a becomes a proportionality coefficient kp after going through the rate-of-change limiter LAGj and is input to the opening-degree change command computing unit 24b. Likewise, the integral coefficient Ki calculated by the integral-coefficient correcting unit 25b becomes an integral coefficient ki after going through the rate-of-change limiter LAGk and is input to the opening-degree change command computing unit 24b.

In particular, the coefficient correcting unit 25 calculates the proportionality coefficient Kp and the integral coefficient Ki such that a variation range of the integral coefficient Ki (e.g., a ratio between a maximum value and a minimum value) is larger than a variation range of the proportionality coefficient Kp (i.e., a ratio between a maximum value and a minimum value) within a refrigeration flow-rate variation range. For example, the integral correction exponential factor NKi is set to 3, and the proportionality correction exponential factor NKp is set to 2.

The opening-degree command computing unit 24c calculates an opening-degree command LEV on the basis of the opening-degree change command dLEV in the current control cycle computed by the opening-degree change command computing unit 24b and an opening-degree command pLEV for the expansion valve 14 in the preceding control cycle. Furthermore, the opening-degree command computing unit 24c calculates the opening-degree command LEV for the expansion valve 14 in the current control cycle by adding a feed forward amount dff calculated by the feed forward unit 26, as in Expression (14) below. The opening-degree command computing unit 24c receives a feed forward amount dff obtained after a feed forward amount dFF goes through the rate-of-change limiter LAGl.

[Expression 14]

$$LEV = pLEV + dLEV + dff \quad (14)$$

The feed forward unit 26 is formed of, for example, a high-pass filter and includes a feed-forward computing unit 26a and a feed-forward-coefficient correcting unit 26b. The feed-forward computing unit 26a has a preset lag time constant Tff and receives a rotation-frequency command cf obtained after the rotation-frequency command CF goes through the rate-of-change limiter LAGc. Then, the feed-forward computing unit 26a uses the received rotation-frequency command cf to output the feed forward amount dFF to be added to the opening-degree command LEV for the expansion valve 14 on the basis of Expression (15) below.

[Expression 15]

$$dFF = kff(cf - pcf) - \frac{pFF}{Tff} dt \quad (15)$$

Expression (15) is the simplest difference expansion expression of a high-pass filter in which kff denotes a feed-forward proportionality coefficient and pFF denotes a feed-forward integral amount in the preceding control cycle. A feed-forward integral amount FF in the current control cycle can be expressed as in Expression (16) below.

[Expression 16]

$$FF = pFF + dFF \quad (16)$$

Furthermore, the feed-forward proportionality coefficient kff is a value obtained after a feed-forward proportionality coefficient Kff calculated by the feed-forward-coefficient correcting unit 26b goes through the rate-of-change limiter LAGm. On the basis of Expression (17) below, the feed-forward-coefficient correcting unit 26b calculates a feed-forward proportionality correction coefficient RKff ($=rf^{NKff}$) by using the flow-rate correction coefficient rf and a feed-forward proportionality correction exponential factor NKff, and also calculates a feed-forward proportionality coefficient Kff by using the feed-forward proportionality correction coefficient RKff and a feed-forward proportionality reference value Kffbase.

[Expression 17]

$$Kff = RKff \cdot Kffbase = rf^{NKff} Kffbase \quad (17)$$

Although the feed-forward proportionality correction coefficient RKff is exemplified as the flow-rate correction coefficient rf to the power of NKff in Expression (17), the feed-forward proportionality correction coefficient RKff may alternatively be another mathematical expression or another function using the flow-rate correction coefficient rf, as exemplified in Expression (12a) and Expression (13a). Furthermore, although the control device 20 is exemplified as having the feed forward unit 26, the opening-degree command LEV may be calculated without adding the feed forward amount dff in Expression (14) above. Although such calculation may lead to poorer followability of the discharge temperature Td relative to the set discharge temperature Tdset or a temporary increase in the discharge-temperature deviation dtd when the load fluctuates, as compared with the case where the feed forward unit 26 is provided, it is still possible to control the discharge temperature Td to the set discharge temperature Tdset.

Furthermore, the expansion-valve control unit 24 includes an opening-degree correcting unit 24d that corrects the opening-degree command LEV calculated by the opening-degree command computing unit 24c to match the actual properties of the expansion valve 14. In detail, in a case where the opening-degree command LEV calculated by the opening-degree command computing unit 24c and a flow rate flow of refrigerant passing through the expansion valve 14 have a nonlinear relationship, the opening-degree correcting unit 24d performs a correction so that they have a linear relationship. The opening-degree correcting unit 24d corrects the opening-degree command LEV to a corrected opening degree actualLEV on the basis of Expression (18) and Expression (19) below.

[Expression 18]

$$\text{flow} \propto LEV = f0(\text{actual}LEV) \quad (18)$$

[Expression 19]

$$\text{actual}LEV = f0^{-1}(LEV) \quad (19)$$

In Expression (19), a function f0 indicates the relationship between the actual opening degree actualLEV of the expansion valve 14 and the opening-degree command LEV and is appropriately set to match the properties of the expansion valve 14. For example, in a case where LEV>0 is assumed, $f0(LEV) = LEV^2$ satisfies $f0^{-1}(LEV) = LEV^{1/2}$.

Figure 4:
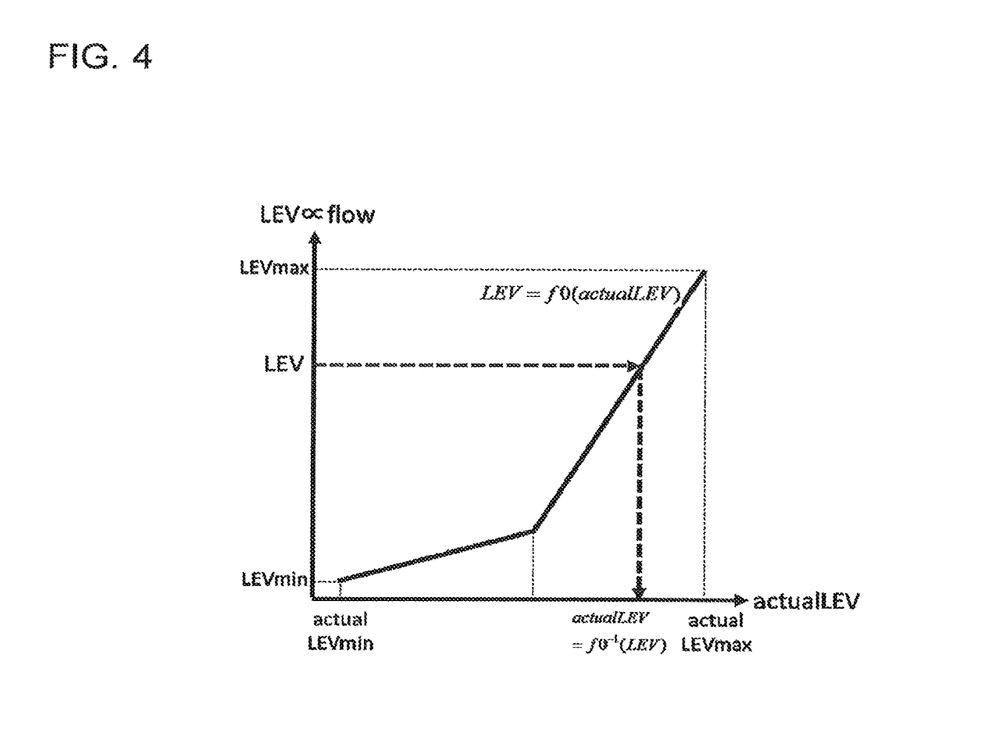
FIG. 4 is a graph illustrating an example of the relationship between an opening-degree command proportional to a refrigerant flow rate and a corrected opening-degree command.

FIG. 4 is a graph illustrating an example of the relationship between an opening-degree command proportional to the refrigerant flow rate and a corrected opening-degree command. In FIG. 4, the expansion valve 14 has a nonlinear relationship in which the rate of increase (i.e., the gradient) of the opening-degree command LEV relative to the corrected opening-degree command actualLEV changes on its way. In this case, the opening-degree correcting unit 24d defines an inverse function $f0^{-1}$ for each region having a different gradient and calculates the corrected opening-degree command actualLEV obtained by correcting the opening-degree command LEV on the basis of Expression (19).

Although the case where the expansion valve 14 used has the nonlinear relationship between the actual opening-degree command actualLEV and the refrigerant flow rate flow is exemplified, the opening-degree correcting unit 24*d* is not required when the expansion valve 14 has a linear relationship.

The flow-rate-correction-coefficient calculating unit 27 calculates a flow-rate correction coefficient from the flow rate of refrigerant circulating through the refrigerant circuit 1*x* and a preset flow-rate reference value. The flow rate of refrigerant circulating through the refrigerant circuit 1*x* increases as the opening degree of the expansion valve 14 increases. The flow-rate-correction-coefficient calculating unit 27 calculates a flow-rate correction coefficient Rf by using the opening-degree command LEV calculated by the opening-degree command computing unit 24*c* as a parameter indicating the refrigerant flow rate. In this case, a correction is performed using an opening-degree-command reference value LEVbase, also serving as a flow-rate reference value, to accurately determine the flow-rate correction coefficient Rf by using a pre-corrected opening-degree command LEV. This opening-degree-command reference value LEVbase is an opening-degree command for the expansion valve 14 at a refrigerant-flow-rate reference point in a steady state and is preset as a flow-rate reference value in the flow-rate-correction-coefficient calculating unit 27. In detail, the flow-rate-correction-coefficient calculating unit 27 calculates the flow-rate correction coefficient Rf on the basis of Expression (20) below.

[Expression 20]

$$Rf = \frac{lev}{LEVbase \cdot rp} \quad (20)$$

In Expression (20), an opening-degree command lev obtained after the opening-degree command LEV goes through the rate-of-change limiter LAGo is used as a parameter indicating a pre-corrected refrigerant flow rate. Furthermore, the flow rate of refrigerant flowing through the expansion valve 14 is dependent not only on the opening degree of the expansion valve 14 but also on the discharge pressure of the compressor 11, and therefore a pressure correction coefficient rp in Expression (20) is used to correct the flow-rate correction coefficient Rf on the basis of pressure (a pressure difference between before and after the expansion valve 14 to be exact), in the case where the opening-degree command lev for the expansion valve 14 is used as a refrigerant flow rate.

Furthermore, the pressure correction coefficient rp in Expression (20) is calculated by a pressure-correction-coefficient calculating unit 28. The flow-rate-correction-coefficient calculating unit 27 uses a pressure correction coefficient rp, obtained after the pressure correction coefficient Rp goes through the rate-of-change limiter LAGp, to calculate the flow-rate correction coefficient Rf on the basis of Expression (20). The pressure-correction-coefficient calculating unit 28 calculates the pressure correction coefficient Rp on the basis of Expression (21) below from the discharge pressure pd and the suction pressure ps estimated using the condensing temperature Tc and the evaporating temperature Te. The pressure-correction-coefficient calculating unit 28 receives a discharge pressure pd obtained after the discharge pressure Pd goes through the rate-of-change limiter LAGe, and also receives a suction pressure ps obtained after the suction pressure Ps goes through the rate-of-change limiter LAGd.

[Expression 21]

$$Rp = \left(\frac{pd - ps}{dPbase}\right)^{Np} \quad (21)$$

In Expression (21), dPbase denotes a pressure-difference reference value corresponding to a reference refrigerant flow rate, and Np denotes a pressure correction exponential factor (e.g., ½). The pressure-difference reference value dPbase and the pressure correction exponential factor Np are preset in the pressure-correction-coefficient calculating unit 28.

Consequently, the flow-rate-correction-coefficient calculating unit 27 calculates the flow-rate correction coefficient Rf by using the pressure correction coefficient Rp so that the flow-rate correction coefficient Rf can be calculated accurately. Specifically, in a case where the flow-rate correction coefficient Rf is calculated using the opening-degree command lev alone, the opening-degree command lev may sometimes be different from the actual refrigerant flow rate, resulting in inaccuracy. For example, even in a case where the opening-degree command lev is a predetermined value, the flow rate of refrigerant passing through the expansion valve 14 ideally doubles when the pressure difference between before and after the expansion valve 14 becomes four times the magnitude of a predetermined pressure. Consequently, setting the refrigerant flow rate using the opening-degree command lev alone may sometimes result in inaccuracy.

The flow-rate-correction-coefficient calculating unit 27 calculates the flow-rate correction coefficient Rf by using the pressure correction coefficient Rp, as in Expression (20), to accurately calculate the refrigerant flow rate from the opening-degree command lev. In the case where only the opening-degree command lev for the expansion valve 14 is used as the refrigerant flow rate, the flow-rate correction coefficient Rf is calculated on the basis of a flow-rate correction coefficient lev/LEVbase and the pressure correction coefficient rp, taking account of a pressure correction. In Expression (20), the flow-rate correction coefficient Rf is corrected by multiplying the pressure correction coefficient rp by the opening-degree-command reference value LEVbase serving as a flow-rate reference value with respect to the pressure-difference reference value dPbase.

Expression (20) is an example of a mathematical expression for calculating the flow-rate correction coefficient Rf, and may be another mathematical expression. Moreover, although an opening-degree command lev is used as a parameter indicating the refrigerant flow rate, the rotation-frequency command CF may alternatively be used. When the rotation-frequency command CF for the compressor 11 is used, the rotation-frequency command at the reference point becomes the flow-rate reference value.

As mentioned above, the proportionality coefficient kp and the integral coefficient ki used when the expansion-valve control unit 24 calculates the opening-degree change command dLEV change in the proportionality-coefficient correcting unit 25*a* and the integral-coefficient correcting unit 25*b* corresponding to the flow-rate correction coefficient Rf. In particular, the integral coefficient Ki is set such that its variation range corresponding to a change in the flow-rate correction coefficient Rf is larger than that of the proportionality coefficient Kp.

Figure 5:
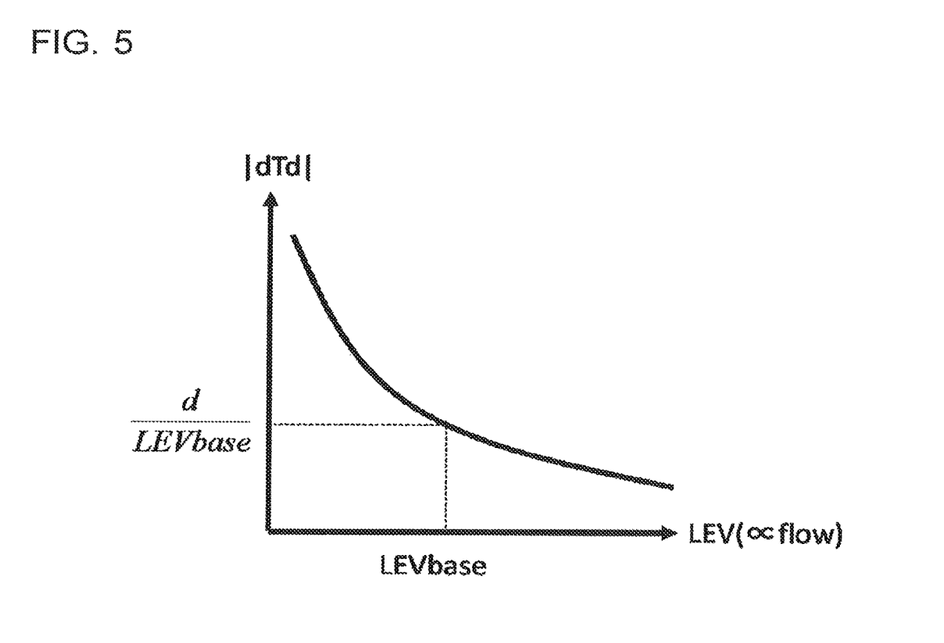
FIG. 5 is a graph illustrating the relationship between an opening-degree command LEV of an expansion-valve control unit in a steady state and the amount of change in discharge temperature.

FIG. 5 is a graph illustrating the relationship between the opening-degree command LEV of the expansion-valve control unit 24 in a steady state and the amount of change in the discharge-temperature deviation dTd. As illustrated in FIG. 5, an absolute value |dTd| of the discharge-temperature deviation dTd in the compressor 11 is ideally inversely proportional to the opening-degree command LEV for the expansion valve 14. This implies that the refrigerant flow rate is equivalent to the amount of heat conveyed in the refrigerant circuit 1x, as indicated in Expression (22) below. The numerator d on the right side of Expression (22) denotes a constant required in a relational expression between the absolute value |dTd| of the discharge-temperature deviation dTd and the opening-degree command LEV.

[Expression 22]

$$|dTd| = g(LEV) = \frac{d}{LEV} \quad (22)$$

For example, a case is assumed where an identical change Δflow in the refrigerant flow rate is individually given to a case where the refrigerant flow rate is a predetermined refrigerant flow rate flow and a case where the refrigerant flow rate is a doubled flow rate 2flow. With regard to the amount of change in discharge temperature, the discharge-temperature deviation dTd in the case of the doubled flow rate 2flow is ½ of the discharge-temperature deviation dTd in the case of the refrigerant flow rate flow.

Furthermore, the discharge-temperature deviation dTd corresponds to a system gain Kx. Specifically, the system gain Kx is inversely proportional to the refrigerant flow rate. Moreover, when the refrigerant flow rate becomes the doubled refrigerant flow rate 2flow, the time required for the refrigerant to circulate through the refrigerant circuit 1x decreases by half, as compared with the case of the refrigerant flow rate flow, also causing the time required for the discharge temperature to change to decrease by half. A system dead time Lx is ideally inversely proportional to the refrigerant flow rate. In one commonly-known method of giving a parameter to a PI controller, the proportionality coefficient Kp is proportional to a value obtained by dividing a system time constant Tx by the system gain Kx and the system dead time Lx, and the integral coefficient Ki is proportional to a value obtained by further dividing the proportionality coefficient Kp by the system dead time Lx. Consequently, the proportionality coefficient Kp is ideally proportional to the square of the refrigerant flow rate, as in Expression (23), and the integral coefficient Ki is proportional to the cube of the refrigerant flow rate, as in Expression (24).

[Expression 23]

$$Kp \propto Tx/Kx/Lx \propto \text{flow}^2 \quad (23)$$

[Expression 24]

$$Ki \propto Kp/Lx = Tx/Kx/Lx^2 \propto \text{flow}^3 \quad (24)$$

The proportionality correction exponential factor NKp is set to 2, and the integral correction exponential factor NKi is set to 3. These values are ideal values and are not limited to these numerical values so long as the integral correction exponential factor NKi is set to be larger than the proportionality correction exponential factor NKp. Values corrected to match the system may actually be used, such as NKp=1.5 and NKi=2.5.

As described above, when the refrigeration cycle apparatus 1 is controlled such that the room temperature Tr is controlled to the set room temperature Trset and the discharge temperature Td is set to the set discharge temperature Tdset, the control parameters required in the control device 20 are five parameters, namely, the flow-rate reference value LEVbase, the pressure reference value dpbase, the feed-forward proportionality reference value Kffbase, the proportionality-coefficient reference value Kpbase, and the integral-coefficient reference value Kibase.

For each of the flow-rate reference value LEVbase, the pressure reference value dpbase, the feed-forward proportionality reference value Kffbase, the proportionality-coefficient reference value Kpbase, and the integral-coefficient reference value Kibase, a value when a steady state is achieved or a tuned value when a steady state is achieved is set. For each of these five parameters, a value when a steady state that satisfies responsiveness and stability through, for example, various types of tests is achieved is preset. Then, a deviation from each reference point in the actual operating state is calculated as a ratio, such as the flow-rate correction coefficient Rf, the pressure correction coefficient Rp, the feed-forward proportionality correction coefficient RKff, the proportionality correction coefficient RKp, and the integral correction coefficient RKi. Thus, even when the operating state deviates from the steady state due to, for example, a change in the load, the proportionality coefficient Kp and the integral coefficient Ki of the expansion-valve control unit 24 and, optionally, the feed-forward proportionality coefficient Kff of the feed-forward computing unit 26a are always maintained at values suitable for each operating state depending on the various types of correction expressions mentioned above. Moreover, the five coefficients are set using Expression (1) to Expression (24) above from, for example, temperatures automatically measured by the sensors even when the operating state changes.

For example, during steady and stable cooling operation in which the outdoor-side heat exchanger 13 acts as a condenser and the indoor-side heat exchanger 15 acts as an evaporator, a case is assumed where the set room temperature Trset is reduced by operating, for example, a remote controller, so that the set room temperature Trset becomes lower than the measured room temperature Tr. Then, the rotation-frequency command CF is calculated on the basis of the room-temperature deviation dtr such that the rotation frequency of the compressor 11 increases.

As the rotation frequency of the compressor 11 increases, the refrigerant flow rate in the refrigerant circuit 1x increases, the pressure or the temperature of the refrigerant in the indoor-side heat exchanger 15 decreases, and the pressure or the temperature of the refrigerant in the outdoor-side heat exchanger 13 increases. As a result, the amount of heat received from the indoor air IA and transferred to the outdoor air OA increases to cause the room temperature Tr to decrease, so that the room temperature Tr approaches the set room temperature Trset. Consequently, the room temperature Tr is controlled to the set room temperature Trset.

When the rotation frequency of the compressor 11 increases, the discharge temperature Td of the refrigerant from the compressor 11 increases. In that case, the set discharge temperature Tdset calculated by the discharge-temperature setting unit 22 also increases at the same time. However, because the increasing range of the discharge temperature Td is larger than the increasing range of the set discharge temperature Tdset, the discharge temperature Td becomes higher than the set discharge temperature Tdset. Then, the expansion-valve control unit 24 calculates the opening-degree command LEV on the basis of the discharge-temperature deviation dtd, and calculates the opening-degree command LEV and the corrected opening-degree command actualLEV by which the opening degree of the expansion valve 14 increases.

When the opening-degree command LEV is determined, the flow-rate correction coefficient Rf is calculated, and the proportionality coefficient Kp and the integral coefficient Ki are calculated using the flow-rate correction coefficient Rf. Then, the opening-degree change command dLEV is calculated using the proportionality coefficient Kp and the integral coefficient Ki, and the opening-degree command pLEV in the preceding control cycle is added so that the opening-degree command LEV is determined. The feed forward amount dff calculated by the feed-forward computing unit 26a corresponding to an increase in the rotation-frequency command CF increases. Consequently, the increasing range of the opening-degree command LEV for the expansion valve 14 becomes larger than that in a case where the feed forward amount dff is not added.

When the opening degree of the expansion valve 14 increases, the flow rate of refrigerant flowing through the expansion valve 14 increases. Then, the pressure or the temperature of the refrigerant before passing through the expansion valve 14 tends to decrease, and the pressure or the temperature of the refrigerant after passing through the expansion valve 14 tends to decrease. As a result, the discharge temperature Td decreases and approaches the set discharge temperature Tdset. Consequently, the discharge temperature Td is controlled to the set discharge temperature Tdset.

In a case assumed where the relationship between an input of the flow rate of refrigerant passing through the expansion valve 14 as a flow-rate correction coefficient rf and an output as a discharge temperature Td is defined as a function of a first-order lag and dead time, the system gain Kx is inversely proportional to the refrigerant flow rate, and the system dead time Lx is also inversely proportional to the refrigerant flow rate. For example, in a case where the refrigerant flow rate changes and doubles, the discharge temperature Td changes accordingly, and the system gain Kx and the system dead time Lx decrease by half. On the other hand, the system time constant Tx basically does not change as the total amount of refrigerant does not change in the refrigerant circuit 1x.

Ideally, the proportionality coefficient Kp has to be proportional to the square of the refrigerant flow rate, and the integral coefficient Ki has to be proportional to the cube of the refrigerant flow rate. For example, in a case where the variation range of the refrigerant flow rate corresponding to a load range is ½ to 2 relative to the flow-rate reference value LEVbase, the variation range of the proportionality coefficient Kp becomes ¼ to 4 relative to the proportionality-coefficient reference value Kpbase, and the variation range of the integral coefficient Ki becomes ⅛ to 8 relative to the integral-coefficient reference value Kibase. Thus, the ratio between the maximum and the minimum of the proportionality coefficient Kp becomes 1/16, and the ratio between the maximum and the minimum of the integral coefficient Ki becomes 1/64.

The coefficient correcting unit 25 calculates the proportionality coefficient Kp and the integral coefficient Ki such that the ratio between the maximum value and the minimum value of the variation range of the integral coefficient Ki is larger than the ratio between the maximum value and the minimum value of the variation range of the proportionality coefficient Kp in the variation range of the refrigerant flow rate. In detail, as indicated in Expression (12) and Expression (13) above, the proportionality correction exponential factor NKp exponentially raising the flow-rate correction coefficient rf indicating the refrigerant flow rate is set to 2, and the integral correction exponential factor NKi is set to 3. Consequently, it is necessary to change the proportionality coefficient Kp and the integral coefficient Ki in the above-described manner in the expansion-valve control unit 24 to perform a proportional action and an integral action such that both responsiveness and stability can both be appropriately maintained over, for example, the entire variation range of ½ to 2 of the refrigerant flow rate.

By performing calculation such that the variation range of the integral coefficient Ki is larger than the variation range of the proportionality coefficient Kp, the variation response of the discharge temperature Td relative to the opening degree of the expansion valve 14 can be made uniform over a wide load range. As a result, the responsiveness and stability with respect to the control of the discharge temperature Td by the expansion-valve control unit 24 can be improved over a wide load range. Moreover, it is possible to suppress, over a wide load range, deterioration in energy saving properties caused by an increase in time in which a mismatch between the rotation frequency of the compressor 11 and the opening degree of the expansion valve 14 occurs due to slow responsiveness of the expansion-valve control unit 24.

Furthermore, when the feed-forward computing unit 26a that adds the feed forward amount dff corresponding to the rotation-frequency command CF for the compressor 11 to the control output of the expansion-valve control unit 24 is provided, the responsiveness of the discharge temperature Td by the expansion-valve control unit 24 having slow responsiveness can be further improved, as compared with the responsiveness of the room temperature Tr of the indoor air IA by the compressor control unit 21. Consequently, it is possible to suppress deterioration in energy saving properties caused by an increase in time in which a mismatch between the rotation frequency of the compressor 11 and the opening degree of the expansion valve 14 occurs due to slow responsiveness of the expansion-valve control unit 24. As a result, the responsiveness of the room temperature Tr of the indoor air IA acting as a heat demanding part of the compressor control unit 21 can be further improved.

In this case, as the feed-forward-coefficient correcting unit 26b that corrects the magnitude of the feed forward amount dff corresponding to the refrigerant flow rate is provided, the feed forward amount dff can be appropriately set over a wide load range, and the feed forward effect can be improved.

Furthermore, because the opening-degree command LEV serving as a control output of the expansion-valve control unit 24 is regarded as a refrigerant flow rate, the feed-forward proportionality coefficient Kff, the proportionality coefficient Kp, and the integral coefficient Ki can be easily corrected without measuring the refrigerant flow rate.

Moreover, as the control device 20 further includes the pressure-correction-coefficient calculating unit 28 that calculates the pressure correction coefficient Rp for correcting the flow-rate correction coefficient Rf on the basis of the discharge pressure Pd and the suction pressure Ps, the flow-rate correction coefficient Rf can be corrected on the basis of the pressure, and the flow rate of refrigerant actually flowing through the expansion valve 14 can be accurately calculated. Thus, the corrections on the basis of the feed-forward proportionality coefficient Kff, the proportionality coefficient Kp, and the integral coefficient Ki calculated using the flow-rate correction coefficient Rf become more accurate.

Furthermore, when the control device 20 has the discharge-pressure calculating unit 23a that calculates the discharge pressure from the condensing temperature Tc and the suction-pressure calculating unit 23b that calculates the suction pressure from the evaporating temperature Te, the flow-rate correction coefficient rf on the basis of the pressure can be calculated without directly measuring the pressure.

Moreover, in the case where the expansion-valve control unit 24 includes the opening-degree correcting unit 24d that calculates the corrected opening-degree command actual-LEV by correcting the opening-degree command LEV, the characteristic of the corrected opening-degree command actualLEV of the expansion valve 14 relative to the control output of the expansion-valve control unit 24 can be made linear. Thus, changes in the discharge temperature Td relative to the control output of the expansion-valve control unit 24 can be made uniform, and the responsiveness and stability of the control of the discharge temperature Td by the expansion-valve control unit 24 can be improved.

Furthermore, when the control device 20 includes the discharge-temperature setting unit 22 that sets the set discharge temperature Tdset on the basis of the rotation-frequency command cf, the discharge pressure Pd, and the suction pressure Ps, an appropriate set discharge temperature Tdset for the expansion-valve control unit 24 corresponding to the operating state of the refrigeration cycle apparatus 1 can be obtained.

Embodiment of the present invention is not limited to Embodiment described above, and various modifications may be added to Embodiment. For example, although the rate-of-change limiters LAGa to LAGp are used in Embodiment described above, they do not have to be used, where appropriate. In particular, in a case where a plurality of first-order lag computing units are used in series, the units may be combined into a single unit. This reduces the total lag time, and less first-order lag enables increased responsiveness of control by the compressor control unit 21 and the expansion-valve control unit 24.

Figure 6:
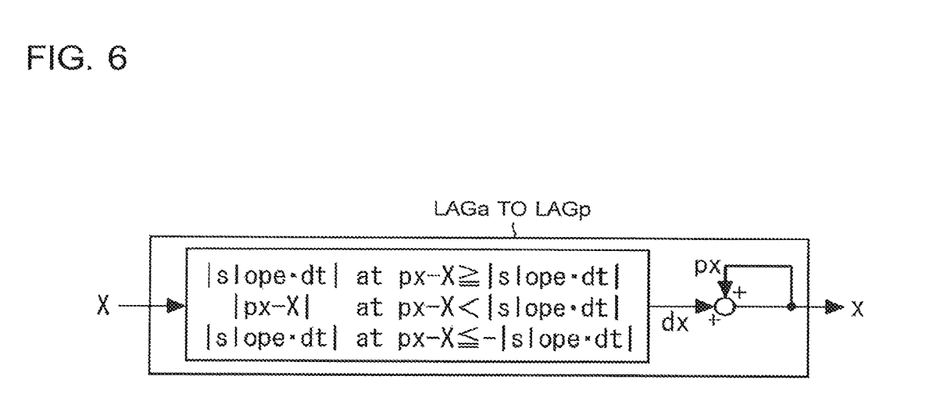
FIG. 6 is a block diagram illustrating another example of each limiting controller in the control device of the refrigeration cycle apparatus in FIG. 2.

Furthermore, although the rate-of-change limiters LAGa to LAGp are described as being first-order lag computing units in Embodiment described above, they may alternatively be change-rate limiters VLMT. FIG. 7 is a block diagram illustrating another example of the rate-of-change limiters in the control device of the refrigeration cycle apparatus in FIG. 1. As indicated in Expression (25) below, the change-rate limiters VLMT in FIG. 7 each calculate an output change dx in which a change in an output x relative to an input X is within a change rate slope. In Expression (25), the output change dx serving as an output of the change-rate limiter VLMT is added to an output px in the preceding control cycle to become an output x in the current control cycle. The output x is equal to px+dx.

[Expression 25]

$$dx = \begin{cases} |slope \cdot dt| & \text{at } X - px \geq |slope \cdot dt| \\ |X - px| & \text{at } |X - px| < |slope \cdot dt| \\ -|slope \cdot dt| & \text{at } X - px \leq -|slope \cdot dt| \end{cases} \quad (25)$$

Furthermore, although the opening-degree command LEV of the expansion-valve control unit 24 is used as a pre-corrected refrigerant flow rate in Embodiment described above, any one of a function value f0 (actualLEV) back-calculated from the opening-degree command actualLEV for the expansion valve 14, a control output of the compressor control unit 21, and a rotation-frequency command for the compressor 11 may be used. However, when the control output of the compressor control unit 21 or the rotation-frequency command for the compressor 11 is set as a value equivalent to the flow rate, a correction of the flow rate on the basis of pressure may be performed in addition to the correction on the basis of the pressure difference of the pressure-correction-coefficient calculating unit 28 as the refrigerant is in a gas phase.

Furthermore, although the refrigerant flow rate is calculated in the control device in Embodiment described above, a refrigerant flow rate measured using a flow rate sensor may be used. Moreover, when the measured refrigerant flow rate is a substance-amount flow rate or a mass flow rate, the correction of the flow rate based on the pressure difference between the pressure-correction-coefficient calculating unit 28 and the pressure correction coefficient Rp is not necessary.

Furthermore, although the refrigeration cycle apparatus 1 cools or heats the inside of a room by cooling or heating the indoor air IA passing through the indoor-side heat exchanger 15 in the indoor unit 1B in Embodiment described above, the refrigeration cycle apparatus 1 may include a heat exchanger that exchanges heat between circulating water and indoor air by cooling or heating the circulating water using the refrigerant instead of using the indoor air IA, and may be configured to cool or heat the inside of a room indirectly. In this case, an indoor-side heat exchanger that exchanges heat between the refrigerant and the circulating water may be provided at the outdoor unit 1A side. Consequently, the refrigerant circuit 1x for the refrigerant can be kept closed in the outdoor unit 1A, thus reducing the risk of leakage of the refrigerant into the room. The above-described heat exchanger for exchanging heat between the circulating water and the indoor air may also be provided with a fan.

Although the refrigeration cycle apparatus 1 can cool and heat the inside of a room in Embodiment described above, the refrigeration cycle apparatus 1 may be configured to perform cooling operation alone or heating operation alone. In particular, in the case of cooling operation alone, the flow switching device 12 is not necessary as the direction in which the refrigerant is circulated through the refrigerant circuit 1x by the compressor 11 does not have to be switched.

Furthermore, although the flow-rate-correction-coefficient calculating unit calculates the flow-rate correction coefficient Rf by using the opening-degree command for the expansion valve 14 calculated by the expansion-valve control unit 24, the flow-rate correction coefficient Rf may be calculated from a parameter from which the refrigerant flow rate can be estimated. For example, the flow-rate correction coefficient may be calculated by computing the refrigerant flow rate from any one of the actual opening degree of the expansion valve 14, the rotation-frequency command CF for the compressor 11, and the actual rotation frequency of the compressor 11.

REFERENCE SIGNS LIST

1 refrigeration cycle apparatus 1A outdoor unit 1B indoor unit 1x refrigerant circuit 2 refrigerant pipe 11 compressor 12 flow switching device 13 outdoor-side heat exchanger 13a outdoor fan 14 expansion valve 15 indoor-side heat exchanger 15a indoor fan 16 discharge sensor 17 first refrigerant temperature sensor 18 second refrigerant temperature sensor 19 air temperature sensor 20 control device of refrigeration cycle apparatus 21 compressor control unit 21a difference calculating unit 21b change-command computing unit 21c rotation-frequency-command calculating unit 22 discharge-temperature setting unit temperature-pressure converting unit 23a discharge-pressure calculating unit 23b suction-pressure calculating unit 24 expansion-valve control unit 24a discharge-deviation calculating unit 24b opening-degree change command computing unit 24c opening-degree command computing unit 24d opening-degree correcting unit 25 coefficient correcting unit 25a proportionality-coefficient correcting unit 25b integral-coefficient correcting unit feed forward unit 26a feed-forward computing unit 26b feed-forward-coefficient correcting unit 27 flow-rate-correction-coefficient calculating unit pressure-correction-coefficient calculating unit actualLEV corrected opening-degree command CF, cf rotation-frequency command pCF, pcf rotation-frequency command in preceding control cycle dCF rotation-frequency change command dFF, dff feed forward amount dLEV opening-degree change command dPbase pressure-difference reference value Np pressure correction exponential factor dt control cycle dtd discharge-temperature deviation dtr room-temperature deviation FF feed-forward integral amount pFF feed-forward integral amount in preceding control cycle flow refrigerant flow rate IA indoor air Kff, kff feed-forward proportionality coefficient RKff feed-forward proportionality correction coefficient NKff feed-forward proportionality correction exponential factor Kffbase feed-forward proportionality reference value Ki, ki integral coefficient Kibase integral-coefficient reference value Kicf integral coefficient of compressor control unit 21 Kp, kp proportionality coefficient Kpbase proportionality-coefficient reference value Kpcf proportionality coefficient of compressor control unit 21 Kx gain LAGa to LAGp rate-of-change limiter LEV, lev opening-degree command LEVbase opening-degree-command reference value (flow-rate reference value) Lx dead time NKi integral correction exponential factor NKp proportionality correction exponential factor OA outdoor air Pd, pd discharge pressure pdtd discharge-temperature deviation in preceding control cycle pdtr room-temperature deviation pLEV opening-degree command in preceding control cycle Ps, ps suction pressure X input dx variation range of output x output px output in preceding control cycle Rf, rf flow-rate correction coefficient (refrigerant flow rate) RKi integral correction coefficient RKp proportionality correction coefficient Rp, rp pressure correction coefficient slope change rate T1, T2 temperature Tc, tc condensing temperature Td, td discharge temperature Tdset, tdset set discharge temperature Te, to evaporating temperature Tff, Tx time constant Tr, tr room temperature Trset, trset set room temperature VLMT change-rate limiter Δflow change in flow rate

The invention claimed is:

1. A refrigeration cycle apparatus comprising:
a refrigerant circuit in which a compressor, a condenser, an expansion valve, and an evaporator are connected by a refrigerant pipe, and
a controller configured to control an opening-degree of the expansion valve,
wherein the controller is configured to
detect a discharge temperature of refrigerant discharged from the compressor with a sensor,
output an opening-degree command for the expansion valve on a basis of a discharge-temperature deviation between the discharge temperature and a set discharge temperature, and at least two types of control parameters including a proportionality coefficient and an integral coefficient such that the discharge temperature becomes the set discharge temperature, and
calculate the proportionality coefficient and the integral coefficient corresponding to a refrigerant flow rate of refrigerant circulating through the refrigerant circuit by correcting preset reference values such that a variation range of the integral coefficient within a variation range of the refrigerant flow rate is larger than a variation range of the proportionality coefficient within the variation range of the refrigerant flow rate.

2. The refrigeration cycle apparatus of claim 1, wherein the controller is configured to output a rotation-frequency command for controlling a rotation frequency of the compressor such that a room temperature measured by a sensor becomes a set room temperature.

3. The refrigeration cycle apparatus of claim 2, wherein the controller is configured to
compute the set discharge temperature on a basis of the output rotation-frequency command and discharge pressure and suction pressure of the compressor,
wherein the discharge pressure and the suction pressure being measured by sensors or being calculated from temperatures measured by sensors.

4. The refrigeration cycle apparatus of claim 2, wherein the controller is configured to calculate a feed forward amount by using the rotation-frequency command and a feed-forward proportionality coefficient, and
add the feed forward amount to the opening-degree command for the expansion valve, and then output the opening-degree command for the expansion valve.

5. The refrigeration cycle apparatus of claim 1, wherein the controller is configured to correct the opening-degree command for the expansion valve such that the opening-degree command for the expansion valve and a refrigerant-flow-rate characteristic specific to the expansion valve have a linear relationship.

6. The refrigeration cycle apparatus of claim 1, wherein the controller is configured to
calculate a flow-rate correction coefficient from the refrigerant flow rate of refrigerant circulating through the refrigerant circuit and a preset flow-rate reference value, and
calculate the proportionality coefficient by correcting a preset proportionality-coefficient reference value on a basis of the flow-rate correction coefficient, and calculate the integral coefficient by correcting a preset integral-coefficient reference value on a basis of the flow-rate correction coefficient.

7. The refrigeration cycle apparatus of claim 6, wherein the controller is configured to control a rotation frequency of the compressor such that a room temperature measured by a sensor becomes a set room temperature.

8. The refrigeration cycle apparatus of claim 7, wherein the controller is configured to calculate the flow-rate correction coefficient from the refrigerant flow rate and the flow-rate reference value, with any of the opening-degree command for the expansion valve, an actual opening degree of the expansion valve, the rotation-frequency command for the compressor, and an actual rotation frequency of the compressor being as the refrigerant flow rate.

9. The refrigeration cycle apparatus of claim 8, wherein the controller is configured to
calculate a pressure correction coefficient by using discharge pressure, suction pressure of the compressor and a preset pressure-difference reference value, wherein the discharge pressure and the suction pressure being measured by sensors or being calculated from temperatures measured by sensors, and calculate the flow-rate correction coefficient by taking account of the pressure correction coefficient.

10. The refrigeration cycle apparatus of claim 7, wherein the controller is configured to calculate a feed forward amount by using the rotation-frequency command for the compressor and a feed-forward proportionality coefficient, and add the feed forward amount to the opening-degree command for the expansion valve, and then output the opening-degree command for the expansion valve.

11. The refrigeration cycle apparatus of claim 10, wherein the controller is configured to calculate the feed-forward proportionality coefficient by correcting a preset feed-forward proportionality reference value on a basis of the flow-rate correction coefficient, and compute the feed forward amount from the feed-forward proportionality coefficient and the rotation-frequency command for the compressor.

12. A controller for a refrigeration cycle apparatus that includes a refrigerant circuit in which a compressor, a condenser, an expansion valve, and an evaporator are connected by a refrigerant pipe, the controller is configured to:

detect a discharge temperature of refrigerant discharged from the compressor from a sensor, output an opening-degree command for the expansion valve on a basis of a discharge-temperature deviation between the discharge temperature and a set discharge temperature, and at least two types of control parameters including a proportionality coefficient and an integral coefficient such that the discharge temperature becomes the set discharge temperature, and calculate the proportionality coefficient and the integral coefficient corresponding to a refrigerant flow rate of refrigerant circulating through the refrigerant circuit, the proportionality coefficient and the integral coefficient is calculated by correcting preset reference values such that a variation range of the integral coefficient within a variation range of the refrigerant flow rate is larger than a variation range of the proportionality coefficient within the variation range of the refrigerant flow rate.

\* \* \* \* \*